F. NOVOTNY.
LIQUID HEATER.
APPLICATION FILED SEPT. 3, 1907.
906,653.
Patented Dec. 15, 1908.
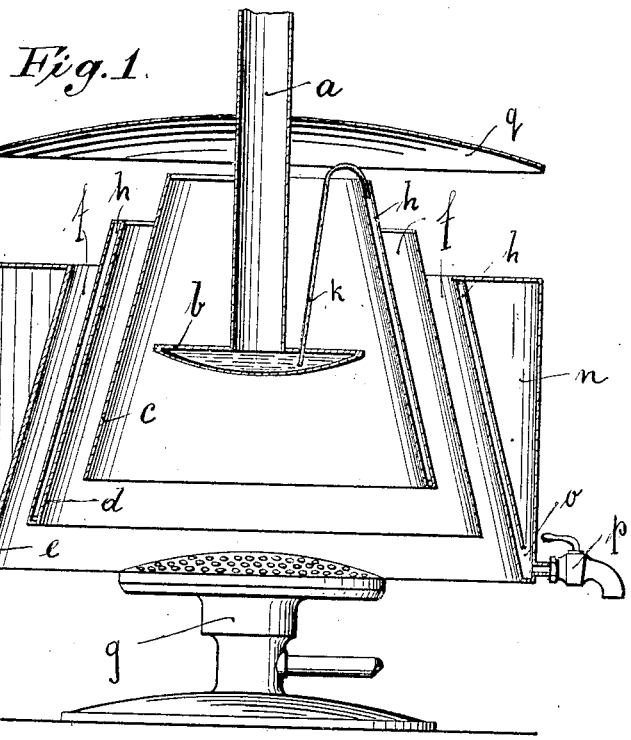
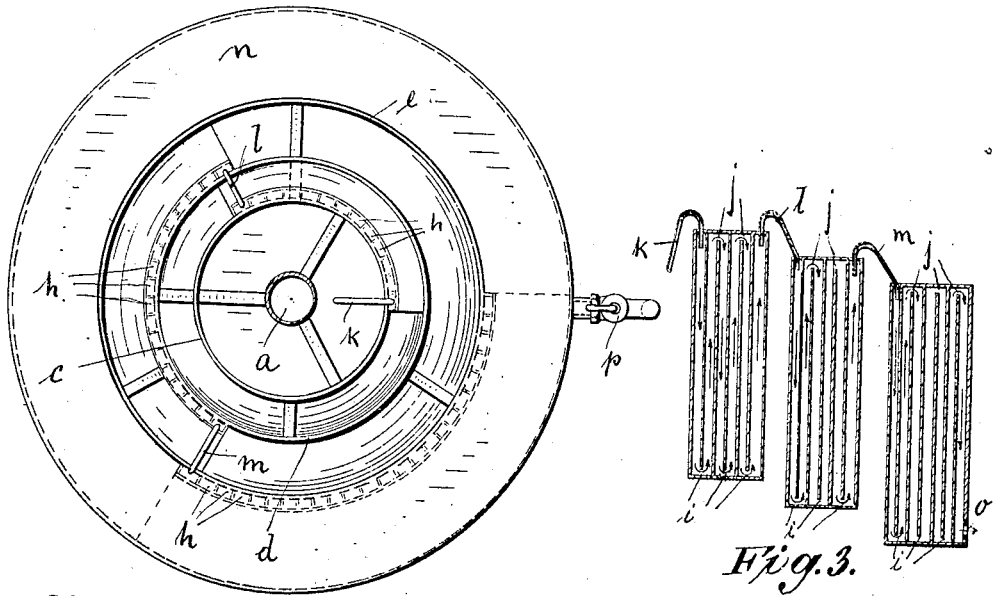

UNITED STATES PATENT OFFICE.

FERDINAND NOVOTNY, OF HOBOKEN, NEW JERSEY.

LIQUID-HEATER.

No. 906,653.  Specification of Letters Patent.  Patented Dec. 15, 1908.

Application filed September 3, 1907. Serial No. 391,091.

*To all whom it may concern:*

Be it known that I, FERDINAND NOVOTNY, a subject of the Emperor of Austria-Hungary, and a resident of Hoboken, county of Hudson, State of New Jersey, have invented certain new and useful Improvements in Liquid-Heaters, of which the following is a specification.

The present invention pertains to heaters for water or other liquids, and has for its object to provide an apparatus whereby the heating of a liquid to the boiling point can be effected in the shortest possible time and with the least consumption of fuel.

To make my invention more clear the same is illustrated in the accompanying drawing in which similar reference letters denote corresponding parts and in which—

Figure 1 is a vertical section; Fig. 2 a plan view of the apparatus; and Fig. 3 a diagram showing the circulation of the liquid.

My apparatus consists of a pipe $a$ which is adapted to be connected with the main supply pipe of the liquid. The free end of this pipe terminates in a closed shallow metal receptacle $b$ secured thereon. Surrounding the pipe and the receptacle $b$ are a number of conically shaped metal cases $c$, $d$, $e$, of different diameters, which are telescopically mounted in and secured to one another to form air flues or passages $f$, the object of which is to create a strong draft for the flame of a gas burner or range $g$ over which the apparatus is to be supported. The cases may preferably be arranged in steps, *i. e.* the inner case being highest, the next following a little lower, the third again lower and so forth, which arrangement is found to be advantageous to increase the draft. Each of the cases is provided on its outer surface with a series of longitudinal narrow ducts $h$, those of each series having apertures $i$, $j$ to communicate alternately on top and bottom with one another. From the closed receptacle $b$ a narrow tube $k$ leads into one of the end ducts $h$ of the inner case $c$, and the other end duct $h$ of the latter communicates by a narrow tube $l$ with one of the end ducts $h$ of the second case $d$. The other end duct of the latter is again by a tube $m$ in communication with one end duct of the next case $e$ and so forth. Surrounding the last case (in the present example the case $e$) is a closed receptacle $n$, with which the end duct of the last case communicates through an aperture $o$. The receptacle has a discharge cock $p$.

The mode of operation of the apparatus is as follows:—Owing to the shallowness of the receptacle $b$ the liquid contained therein will be rapidly heated by the burner $g$ and will rise through the narrow tube $k$ to circulate through the different series of ducts $h$. Because of the draft through the passages $f$, each of the cases will become highly heated transmitting the heat to the ducts thereof, so that finally the liquid, when entering the receptacle $n$, will be heated to the boiling point. The number of cases and ducts depends upon the nature of the liquid to be boiled. Above the cases a reflector $q$ is arranged which may be suitably secured to the pipe $a$.

What I claim and desire to secure by Letters Patent is:—

In a liquid heater, the combination with a burner, of a supply pipe, a shallow metal receptacle communicating with the latter and extending above the burner, a plurality of conical metal cases telescopically mounted in one another and forming draft passages between themselves, a reflector above said cases, a series of longitudinal ducts formed on each case, the individual ducts of each series communicating with one another alternately on top and bottom, a narrow tube leading from the shallow receptacle into one end duct of the inner series, narrow tubes connecting the different series with one another and a receptacle communicating with the outer series of ducts, said receptacle having a discharge, substantially as set forth.

Signed at New York this 31 day of August 1907.

FERDINAND NOVOTNY.

Witnesses:
FELIX STEFFEN,
MAX D. ORDMANN.